Sept. 14, 1965     D. E. WATERS     3,206,745

TERRAIN CLEARANCE SYSTEM

Filed April 10, 1962     10 Sheets-Sheet 1

INVENTOR.
DONALD E. WATERS
BY Kenneth D. Ohm
ATTORNEY

FIG. 5

INVENTOR.
DONALD E. WATERS
BY
ATTORNEY

Sept. 14, 1965    D. E. WATERS    3,206,745
TERRAIN CLEARANCE SYSTEM
Filed April 10, 1962    10 Sheets-Sheet 3

FIG. 6

INVENTOR.
DONALD E. WATERS
BY Kenneth D. Ohm
ATTORNEY

Sept. 14, 1965

D. E. WATERS 3,206,745

TERRAIN CLEARANCE SYSTEM

Filed April 10, 1962

INVENTOR.
DONALD E. WATERS

BY Kenneth D. Ohm

ATTORNEY

Sept. 14, 1965          D. E. WATERS          3,206,745

TERRAIN CLEARANCE SYSTEM

Filed April 10, 1962          10 Sheets-Sheet 6

FIG. 9

INVENTOR.
DONALD E. WATERS
BY Kenneth D. Ohm
ATTORNEY

Sept. 14, 1965 D. E. WATERS 3,206,745
TERRAIN CLEARANCE SYSTEM
Filed April 10, 1962 10 Sheets-Sheet 7

FIG. 12

INVENTOR.
DONALD E. WATERS
BY Kenneth D. Ohm
ATTORNEY

Sept. 14, 1965  D. E. WATERS  3,206,745
TERRAIN CLEARANCE SYSTEM
Filed April 10, 1962  10 Sheets-Sheet 9

INVENTOR.
DONALD E. WATERS
BY Kenneth D. Ohm
ATTORNEY

United States Patent Office 3,206,745
Patented Sept. 14, 1965

3,206,745
TERRAIN CLEARANCE SYSTEM
Donald E. Waters, Minneapolis, Minn., assignor, by mesne assignments, to Litton Systems Inc., Beverly Hills, Calif., a corporation of Maryland
Filed Apr. 10, 1962, Ser. No. 187,452
10 Claims. (Cl. 343—5)

This invention relates generally to airborne radar apparatus. More particularly, the invention is concerned with a novel terrain clearance system which may be used in conjunction with conventional ground mapping radar sets and an absolute altimeter for determining when an aircraft is traversing a dangerous course which, if continued, might well result in a collision with an obstacle projecting upwardly from the ground.

When an airborne radar set having a cosecant-squared antenna pattern is flown at low altitudes above the surface of the earth, so-called radar shadows appear in the radar display. These radar shadows are caused by geographical features which shut off the radar pattern from all targets in the shadow areas behind them. Such shadows are caused by obstacles which are of the order of magnitude of one beam width or wider. At long and short ranges, the shadow for a large obstacle is defined clearly. For a small obstacle, the sensitivity, that is, the capability of detecting a shadow cast thereby, increases greatly as the radar approaches the obstacle.

Broadly, the present invention provides a flight safety system which analyzes a signal having a function or characteristic representative of the radar shadows caused by obstacles that are present in the flight path, in combination with the production of a signal having a function or characteristic representative of the absolute altitude of the aircraft. By determining whether the function or characteristic imparted to the signal by a given shadow, or by a plurality of such shadows, is equal to, less than, or more than a predetermined function or characteristic, by determining whether the function or characteristic of the second signal which is representative of the absolute altitude of the aircraft, is equal to, less than, or more than a predetermined function or characteristic, it can be ascertained whether the aircraft is following a safe or dangerous path and whether said aircraft should turn or climb to avoid colliding with a geographical obstacle, or whether said aircraft can safely descend or continue level flight.

Accordingly, one object of this invention is to provide a system capable of determining from the radar shadows cast by obstacles whether an aircraft is following a safe or dangerous course and whether said aircraft should turn, climb, descend, or level off in order to follow a safe course at a predetermined altitude above the terrain over which the aircraft will fly.

Another object is to provide a small, lightweight airborne electronic system which is used in combination with an absolute altimeter and a ground mapping radar set to provide visual instructions for the pilot for avoiding terrain obstacles which lie in the intended path of an aircraft.

Another object of the invention is to provide a system of the foregoing character that is connected to the radar set through existing or easily obtained facilities with only minor modification of the radar system.

Another object of the invention is to provide a terrain clearance system that may be used in combination with conventional airborne radar and which provides instructions for avoiding terrain obstacles in the intended path of the aircraft while the aircraft radar is scanning.

A further object is to provide a terrain clearance system capable of simultaneous visual warnings to the pilot of terrain obstacles in both the intended aircraft flight path and a portion of the field viewed by the radar system on either side of said path. That is, it is the aim of this invention to provide a system which visually warns the pilot of all collision courses in the intended aircraft flight path and a portion of the field viewed by the radar system on either side of said path and provides information relative to the safety of alternate courses for a number of degrees to the left and right of the heading of the aircraft.

Other objects and advantages of the invention will be apparent from the following description in which certain preferred embodiments of the invention are disclosed. In the drawings which form a part of this application.

The operation of the present invention is based on the existence of radar shadow (no echo return) behind upwardly projecting obstacles or targets and the actual return from the obstacles and the approach thereto. That is, an obstacle in the path of a transmitted radar signal will prevent the return of a signal to the radar set from certain areas lying on the opposite side of said obstacle from said radar set, but will not prevent said returns from regions in between said set and said obstacle.

Figure 1:
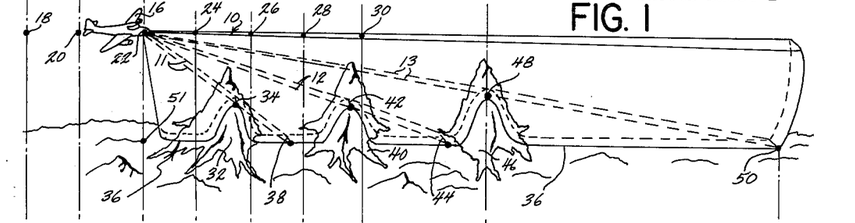
FIGURE 1 shows a narrow beam radar signal which is emitted by an aircraft flying toward a plurality of obstacles.

For ease of explanation, FIG. 1 pictures an exemplary radar signal 10 from a very narrow beam radar in an aircraft 16 flying over terrain which has a profile as shown in this figure in the plane of the radar beam. The dots 18, 20, 22, 24, 26, 28, and 30 indicate a possible flight path of the aircraft 16. With the aircraft 16 at point 22, a portion of (see dotted lines 11) the radar signal 10 grazes an obstacle 32 at 34 and strikes the earth 36 at 38 on the far side of said obstacle. Similarly, with the aircraft 16 at point 22, a portion of (see dotted lines 12) the radar signal 10 grazes obstacle 40 at 42 and strikes the earth 36 at 44 and while another portion (see dotted lines 13) of the signal 10 grazes obstacle 46 at 48 and strikes the earth 36 at 50, respectively.

Figure 2:
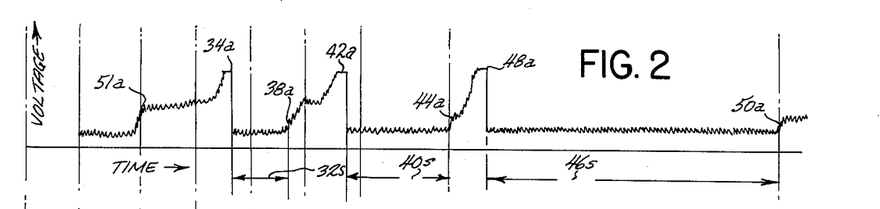
FIG. 2 illustrates a voltage-time characteristic or "A" scope signal derived from the radar return (radar echo) from terrain having an irregular profile as shown in FIG. 1.

For a given transmitted narrow beam radar pulse or signal 10, the return signal (FIG. 2) from terrain with an irregular profile as indicated in FIG. 1 is continuous, as said transmitted signal proceeds along the terrain from a point 51 immediately beneath the aircraft to the crest 34 of the obstacle 32 of FIG. 1 and there are echo returns (see portion of FIG. 2 between numerals 51a and 34a). Beyond the point or crest 34, because of the absence of additional terrain of sufficient altitude between the obstacle 32 and the line 38 to cause return reflection of the radiated energy of the transmitted pulse 10, there is no return signal. As shown in FIG. 1 and illustrated in FIG. 2, the terrain at point 38 is normal and there are no echo returns, i.e., there is a radar shadow, for a certain time interval (see portion of FIG. 2 between numerals 34a and 38a, the irregularities in this portion being receiver noise). With the presence of terrain of sufficient altitude at line 38 of FIGURE 1, the particular transmitted pulse 10 can again "see" (i.e., the pulse again strikes terrain) the terrain profile. The return signal of FIGURE 2 caused by the terrain of FIG. 1, as said transmitted signal proceeds along the terrain from 38 to the crest 42 of the obstacle 40, is again continuous and there are again echo returns (see portion of FIG. 2 between numerals 38a and 42a). In other words, when the transmitted pulse 10 intercepts the terrain at line 38 of FIGURE 1, it illuminates the terrain profile so as to cause perceivable reflection of the transmitted pulse for a distance ahead of the aircraft from line 38 up to the crest 42 of the next following obstacle 40. Beyond this crest 42, because of the absence of terrain of sufficient altitude between the obstacle 40 and the line 44, the return signal (FIG. 2) again ceases and there are no returns, i.e., there is a radar shadow, for a certain time interval (see portion of FIG. 2 between numerals 42a and 44a. The irregularities in this portion are due to receiver noise). Similarly, as said transmitted signal 10 proceeds along the terrain of FIG. 1 from line 44 to line 50, there are echo returns (see the portion of FIG. 2 between numerals 44a and 48a) for the terrain between 44 and 48 and no echo returns, i.e., radar shadow (see the portion of FIG. 2 between numerals 48a and 50a; the irregularities in this portion are receiver noise) for the terrain between lines 48 and 50.

Figure 3:
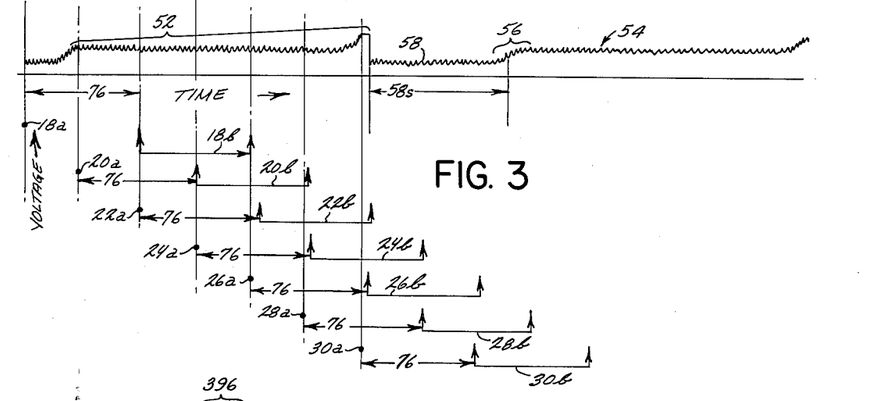
FIG. 3 illustrates voltage-time characteristics of the radar return from one obstacle of FIG. 1 as the aircraft approaches said obstacle.

Thus, for a given narrow beam radar pulse 10, the return therefrom from one obstacle resembles portion 52 of a curve denoted generally by the numeral 54 in FIG. 3 as the radar beam 10 approaches a grazing condition similar to the conditions depicted by either numerals 11, 12, or 13 in FIG. 1. As this transmitted radar pulse continues past one of said grazing conditions, the return signal for said transmitted pulse appears like portion 56 of curve 54. In between portions 52 and 56 there is a portion 58 of no echo return, i.e., radar shadow, that has a length 58s which is dependent upon the time interval between the end of echo return 52 and the start of echo return 56. In the case of the grazing condition 11, the length of this no echo return portion, i.e., radar shadow, like 58s is indicated by 32s of FIG. 2 and is proportional to the distance $\overline{34\ 38}$. Similarly, for grazing conditions 12 and 13 there are no echo return signals, i.e., radar shadows, like portion 58, the lengths of which are indicated by 40s and 46s respectively, and which are proportional to distances $\overline{42\ 44}$ and $\overline{48\ 50}$, respectively. The time span of these no echo return portions, i.e., radar shadows, is indicative of the heights of the objects which cause them and proportional to the length of the shadow (no echo) areas behind said obstacle.

As previously stated, the gated shadow (echo) return from one obstacle resembles curve 54 of FIG. 3. That is, the video output of a radar receiver in an aircraft like 16 for one obstacle appears like curve 54 with the length 58s of the no echo return or radar shadow portion 58 being directly proportional to the height of the obstacle which caused said shadow portion. This portion 58 which is indicative of the length of shadow cast by a given object is one of the fundamental quantities used in the terrain clearance system. The comparison of this portion 58 within a given range with a predetermined quantity provides information relative to whether the aircraft, if it continues on its present course, will collide with or pass above by a predetermined distance the obstacle from which said portion was derived. In the preferred embodiment of this invention this comparison is accomplished for only a relatively small segment or gated portion like 18b of FIG. 3 of the return for any given transmitted radar pulse, i.e., only the small portion of the radar return between the arrows of 18b is analyzed for radar shadow content. The manner of gating will not at the moment be understood, but will be made manifest as the description progresses. The radar shadow content of said gated portion is measured, and if this shadow content is greater than some predetermined value (preferably approximately 90% of the gated portion), a signal is provided.

By reference to FIGURES 1 and 3, it will be hereinafter more clearly understood how the returns from the radar pulse beam 10 are analyzed over relatively gated segments. As the aircraft 16 of FIG. 1 moves from position 18 to positions 20, 22, 24, 26, 28, and 30 in turn, the gated portion between the arrows of 18b, 20b, 22b, 24b, 26b, 28b, and 30b of radar return which is analyzed for said positions 18, 20, 22, 24, 26, 28, and 30, respectively, is fixed at a predetermined range from said aircraft as illustrated by numerals 76 on lines 18a through 30a of FIG. 3. By range is meant the distance along the terrain from a point immediately below the aircraft out to a first point along the terrain between which points, for ease in explaining the operation of this invention, let it be assumed the radar shadow content is not analyzed. The distance from said first point to a second point along the terrain, between which points the radar shadow content is analyzed, is the length of the aforementioned gated portion. The length of the gated portion is adjustable. Preferably, the range from the aircraft will be 8 miles and the length will extend an additional 12 miles, i.e., the gated portion will begin 8 miles from the aircraft and end 20 miles from the aircraft. As can be seen in FIG. 3, there is illustrated the video content of the gated portion of the returns from an obstacle which creates shadow portion 58. Taking the flight of the aircraft 16, in FIG. 1, for example, as the aircraft moves from position 18 to 22 the returns are entirely without shadow. As the aircraft 16 moves on to position 24, the no echo return or radar shadow portion 58 of the curve 54 in FIGURE 3 enters the gated portion 24b. The shadow portion 58 will exceed the predetermined value (for example 90%) of the width of the gated portion shortly thereafter when the aircraft is somewhere between positions 24 and 26. When this occurs, a first, or climb, signal is provided, as will be explained in detail hereinafter.

With the providing of the climb signal the aircraft should be placed in an attitude of climb. The signal will continue until the aircraft has attained an altitude which allows the radar to receive a return from the terrain beyond the obstacle (see, for example, gated portion 28b for aircraft position 28) and when said portion occupies approximately 10% of the gated portion of the radar video return (which is just prior to the aircraft reaching position 28) the climb signal ceases and the aircraft can be safely levelled.

When a pilot becomes aware of the climb signal, he places his aircraft into an attitude of climb which he assumes will allow him to clear the obstacle which caused the signal. He cannot be certain of this, however, without knowing the actual height of the obstacle, and he may proceed on a collision course even in an attitude of climb. To insure a safe flight in this case, a short range alarm, or turn signal is provided. This signal is actuated by another gated portion of return signal (echo), adjustable in the preferred embodiment to analyze from 1 to 8 miles of terrain between the aircraft and the previously mentioned gated portion. As herein described this return signal is caused by terrain closer to the aircraft and analyzed as a gated portion in the manner as previously described, so that when the shadow content of this gated portion of return signal (echo) exceeds a predetermined value, an alarm, or turn signal provides additional warning of terrain at a closer proximity than the gated portions of the radar shadow indicated. If this short range, or turn, alarm is actuated, then the probability that the rate of climb will not allow the pilot to clear the obstacle is much greater, and the selection of an alternate safe aircraft heading should be made.

Figure 4:
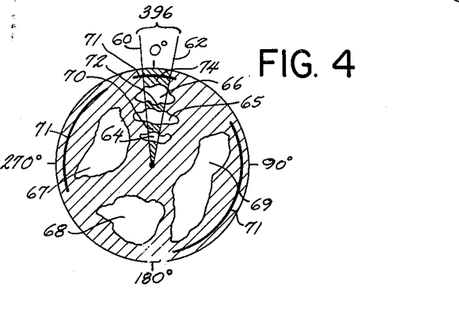
FIG. 4 illustrates radar shadows in a PPI display during a low-level flight over hilly terrain.
Figure 5:
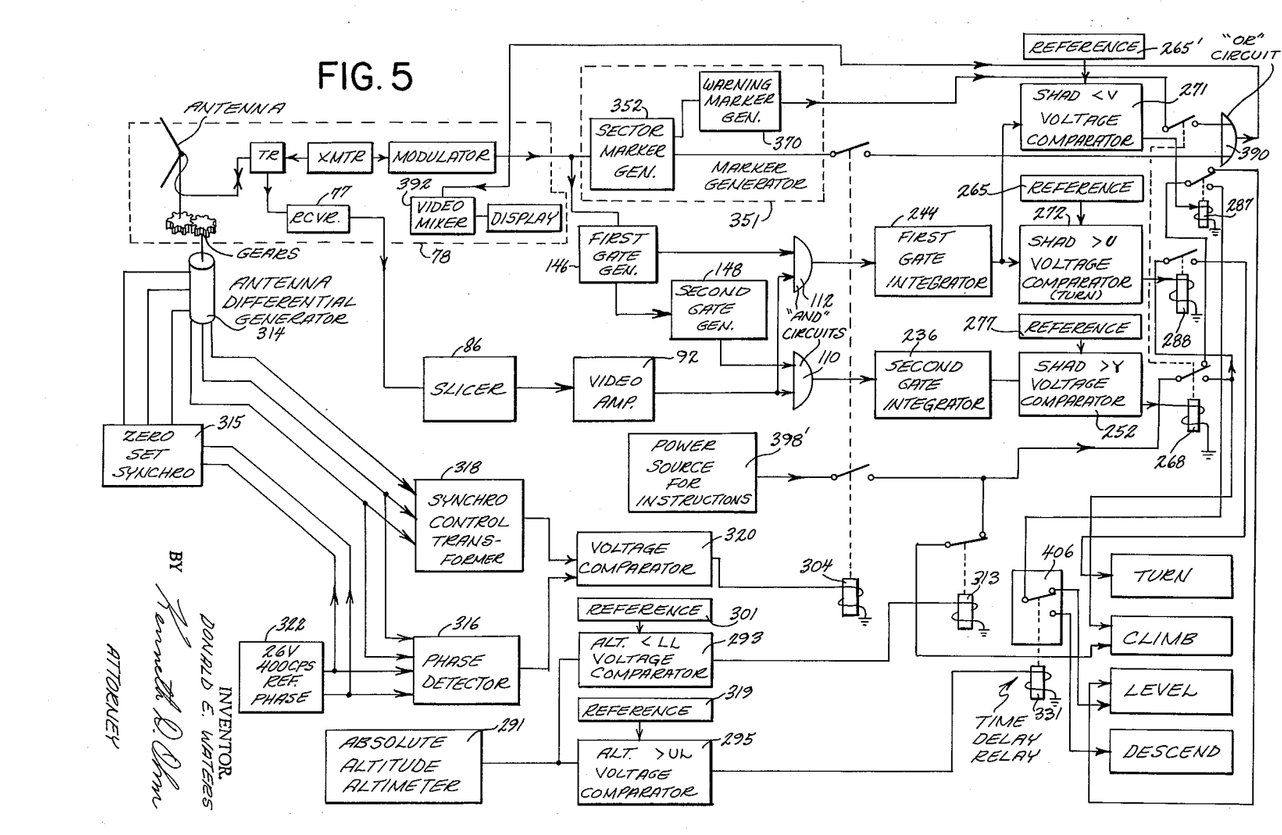
FIG. 5 is a block diagram of the terrain clearance system in combination with a conventional airborne radar set and an absolute altimeter.

As will be recognized, the selection of a safe alternate course is facilitated by this invention, through a combination of multiple return radar shadow portions like 32s, 40s and 46s which appear on the PPI scope, as is herein described. The representative area between lines 60 and 62, as shown in FIGURE 4, is that viewed by a single narrow beam radar pulse such as 10. The white spots 64, 65, 66 depict obstacles such as 32, 40, and 46 of FIG. 1 and the dark areas 70, 72 and 74 are the radar shadows which cause portions 32s, 40s and 46s of FIG. 2 cast by these respective objects. The other white spots 67, 68 and 69 on the PPI scope, FIG. 4, also depict obstacles. If any of these obstacles 67, 68 and 69 are potentially dangerous, i.e., if the aircraft continued at its present altitude or lower and went toward any one of them, it would collide with or fail to clear said one obstacle by a desired distance, the present invention creates a marker line 71 on the PPI behind said potentially dangerous obstacles. Thus, only in the directions represented by the marker line 71 is there danger. Therefore, a safe course would be in any direction represented by the lack of the marker line 71 (for example to the right of an azimuth heading of 0° to a heading somewhere between approximately 15° and 55°).

The detailed theory of operation of the radar shadow length terrain clearance adapter will be presented after the various elements which comprise said adapter set forth in FIGS. 5–16 are described. Referring now to the details of the circuit, attention is first directed to FIG. 5, where a receiver 77 belonging to an airborne, ground-mapping radar set labeled 78 is shown. The receiver 77 output is coupled to a triode 80, depicted schematically in FIG. 6. The triode 80 has a grid 81 and a cathode 82. The grid 81 of the triode 80, therefore, has impressed thereon the return video signals like FIG. 2 from the radar set 78. Connected to the cathode 82 of the triode 80 through a resistor 84 is a slicing circuit 86 for removing what amounts to an intermediate voltage strip from a curve A of FIG. 11, as will presently be explained somewhat more fully. The slicing circuit 86 contains slicing diodes 88 and 90 connected back to back between a video amplifier 92 and a voltage source provided by a bias potentiometer 94. A diode 96 electrically associated with the cathode 82 prevents the output signal of the triode 80 from going negative. Thus, in a well known fashion a slice or voltage strip between the voltage levels 95 and 97 of signal A (FIG. 11) is made available.

The video amplifier 92 includes a triode 98 connected as a cathode follower. The triode 98 has a grid 100. The output, that is, the sliced signal between levels 95 and 97, from the slicer 86 is applied to the grid 100. The video amplifier 92 also contains three triode tubes 102, 104 and 106 which comprise a three-stage amplifier. These tubes 102, 104 and 106 are connected in a manner well known in the art. They increase the signal level and improve the wave form of the sliced video signal.

A triode 108 connected as a cathode follower is connected to the output of the tube 106. This tube 108 is connected to "and" circuits 110 and 112. A diode 114 is connected to the cathode of the triode 108.

As previously stated, for a given transmitted radar pulse there will be a return signal (FIG. 2) caused by terrain with a profile as indicated in FIG. 1. To aid in discussing the operation, FIG. 2 has been reduced slightly in width and now appears as curve A of FIG. 11. In curve A the high spots 122, 124 and 126 indicate obstacles 32, 40 and 46 of FIG. 1 lying in the path of the narrow beam transmitted signal 10, and the low portions 128, 130 and 132 are representative of the radar shadow caused by the obstacles 32, 40 and 46, respectively. The irregularities in the low portions 128, 130 and 132 are due to receiver noise. The signal, curve A, from the radar receiver 77 is applied to the grid 81 of the triode 80. The output of triode 80 is very similar to curve A. This output is applied to the slicing diodes 88 and 90. The forward drop across said diodes is about one half volt. Because of this and with proper adjustment of the potentiometer 94, a one-volt slice (for example between the lines 95 and 97 of curve A) can be taken out of the video signal curve A, i.e., the output of tube 80, between the zero and three-volt level. Such a slice gives a signal like curve B of FIG. 11. In curve B, widths 134, 136 and 138, which represent time spans, are representative of the time duration of the radar shadows 128, 130 and 132, respectively. The diode 96 clamps the signal from the cathode follower 80 and prevents said signal from going negative. This clamping action establishes the D.C. level which references the video signal to the positive bias provided by the potentiometer 94.

Figure 11:
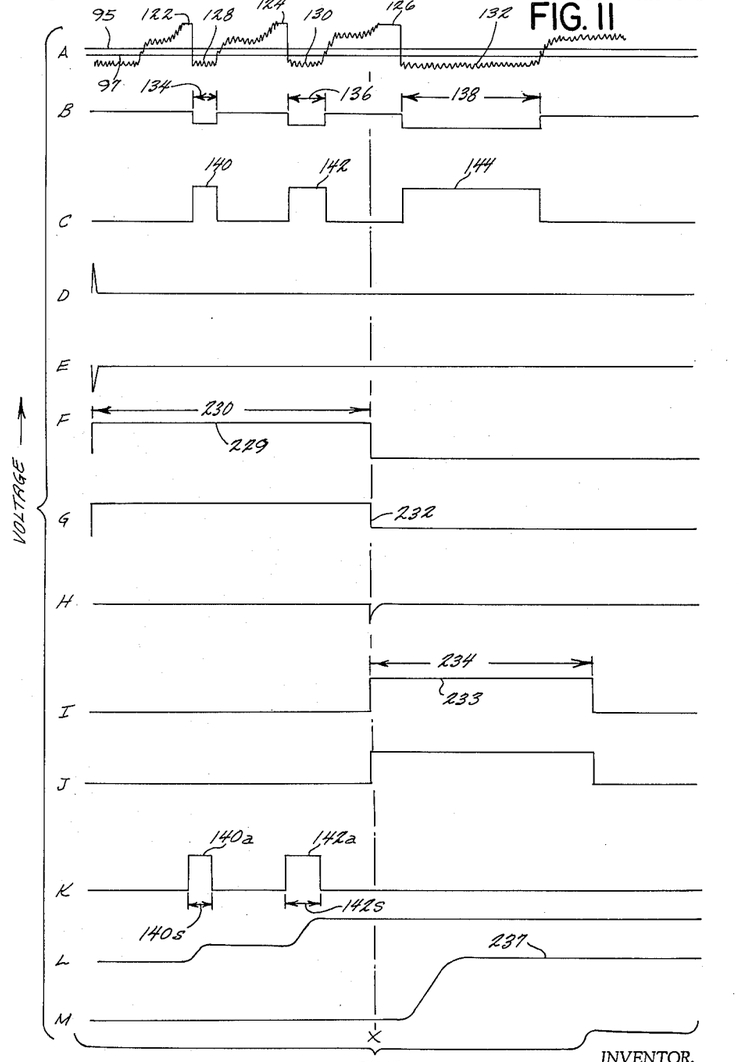
FIG. 11 shows the voltage-time characteristics of the signals appearing in specific portions of the circuits set forth in FIGS. 6, 7, 8 and 9.

The sliced video signal, curve B, is applied to cathode follower 98 of the video amplifier 92 and thus to the three-stage amplifier comprised of tubes 102, 104 and 106. This three-stage amplifier increases the signal level of the sliced video signal and improves its wave form. The output of tube 106 of the three-stage amplifier is applied to the grid of the cathode follower connected triode 108 and said triode, in turn, applies signals like curve C to the "and" gates 110 and 112.

The diode 114 prevents the cathrode of tube 108 from going negative even though said cathode is referenced to a minus 200 volt supply. The wave form of the cathode of the tube 108 which, incidentally, is the output of the video amplifier 92 is a rectangular wave form like curve C of FIG. 11 in which the radar shadow content of the radar video signal is indicated by raised portions 140, 142 and 144. The time interval during which portions 140, 142 and 144 persist is indicative of the height of the obstacle which caused said portions. In the preferred embodiment, the curve C varies in amplitude from zero to approximately 50 volts.

The modified video signals, curve C from the triode 108 are impressed upon one input of each of the "and" circuits 110 and 112. The other input of the "and" circuit 112 is actuated by signals from a first gate generator 146 while the other input of the "and" circuit 110 is actuated by signals from a second gate generator 148.

The first gate generator 146 which is coupled to the airborne radar 78 includes a triode 150 and a screen coupled monostable phantastron circuit which includes a pentode 152 connected in a well known manner with the following elements. These elements include a resistor 154 in the plate circuit of the tube 150. Electrically associated with the resistor 154 is a resistor 156 and a selective gate generator control 159 (see FIG. 7) having a switch 160. The switch 160 has three contacts which, when properly positioned, apply the voltage at the wiper of either potentiometer 162 or 164 to the cathode of diode 168 through the resistor 156. The line connecting the resistor 154 and the resistor 156 is linked to the plate of the pentode 152 by a diode 168. Also connected to the plate of pentode 152 is a capacitor 172. The side of the capacitor 172 which is not connected to the plate of the pentode 152 is linked to the control grid of said pentode. The screen and suppressor grids of the pentode 152 are connected to each other by the parallel combination of a resistor 174 and a capacitor 176. The screen side of the parallel combination of the resistor 174 and capacitor 176 is connected to the grid of a triode 178 connected as a cathode follower. The cathode of the tube 178 is connected to the second input of the "and" gate circuit 112.

The junction of the aforesaid parallel combination of the resistor 174 and the capacitor 176 which is connected to the suppressor of the pentode 152 is connected to the grid of the tube 180. The tube 180 is one of the elements which makes up the second gate generator 148. The cathode of tube 180 is joined to a differentiating circuit 182 comprised of a capacitor 184 and a resistor 186, which are series connected. The common junction 188 between the capacitor 184 and the resistor 186 is coupled to the plate of a pentode 190 through diode 192. The pentode 190 is connected in a well-known manner to make up a phantastron circuit. The plate of the pentode 190 is linked to its control grid through a capacitor 196.

Figure 7:
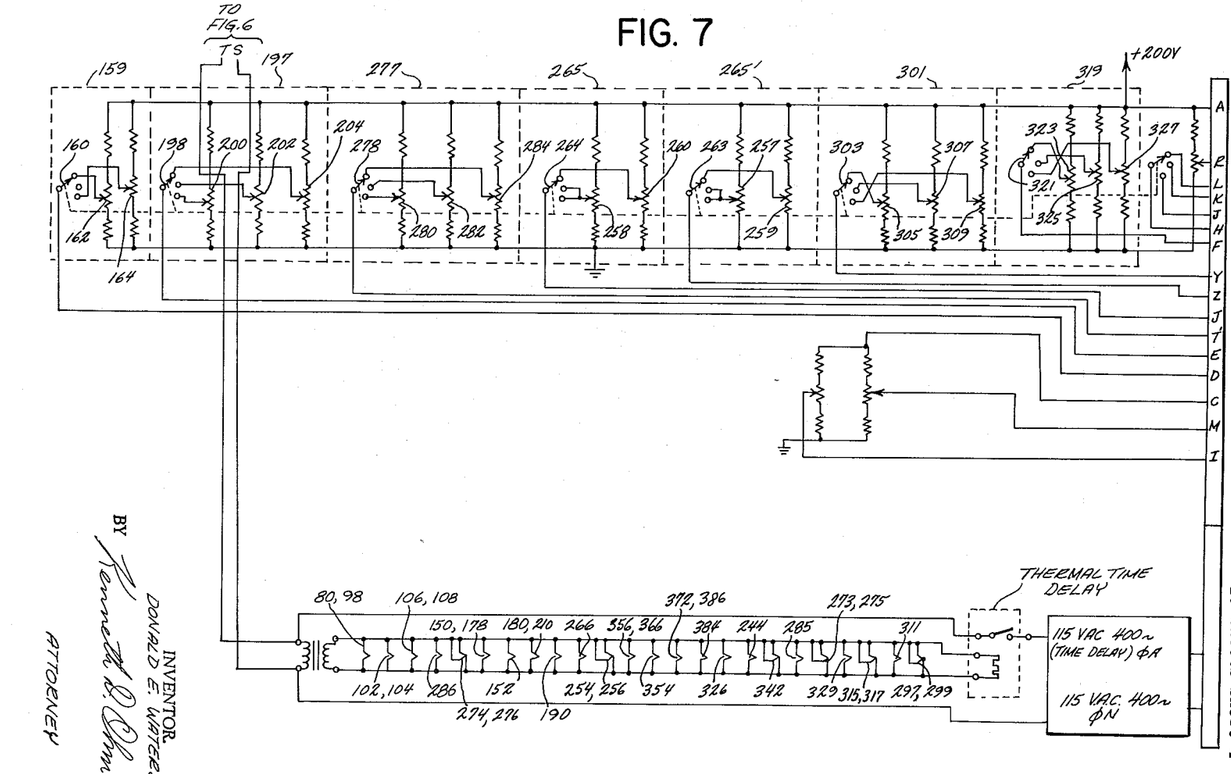

The end of the resistor 186 which is not connected to the juncture 188 is coupled to a selective second gate generator control 197 having a switch 198. Connected to various terminals of the switch 198 are potentiometers 200, 202 and 204. The switch 198 is connected to a positive voltage supply through said potentiometers. The screen and the suppressor grids of the pentode 190 are connected through the parallel combination of a resistor 206 and a capacitor 208. The screen end of this parallel combination is linked to the grid of a triode 210. The cathode of triode 210 is connected to the second input of the "and" gate circuit 110.

In operation, the first gate generator 146 and the second gate generator 148 supply signals to the "and" gate circuits 112 and 110, respectively, in the following manner. With the emission of a narrow beam transmitted radar pulse 10 of FIG. 1 from the airborne radar 78, a signal like curve D of FIG. 11 is impressed upon the grid of the tube 150. This signal, curve D, produces a negative going synchronizing pulse, like curve E, at the plate of the tube 150. The negative going synchronizing pulse of curve E is coupled to the plate circuit of the pentode 152 of the first gate phantastron circuit through the diode 168.

Figure 10:
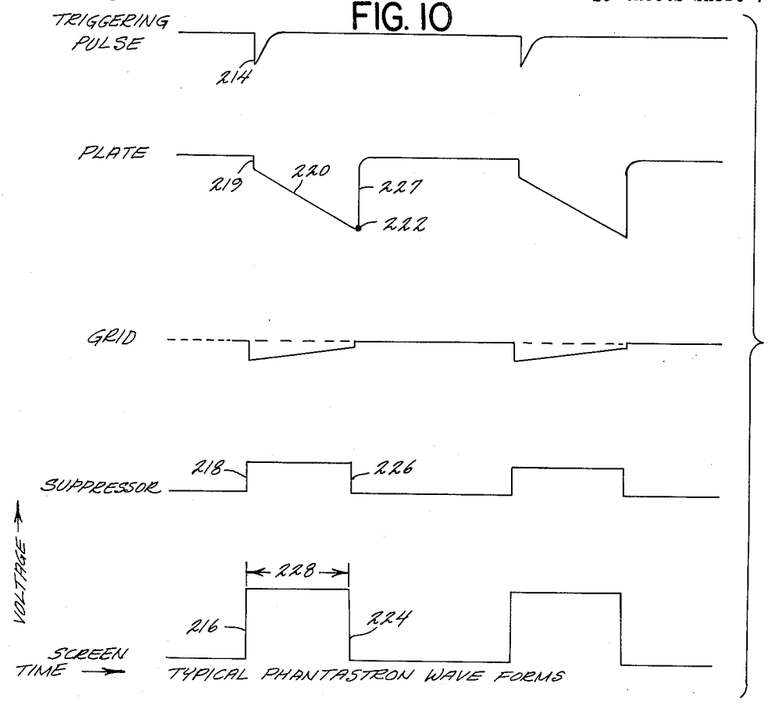
FIG. 10 shows the voltage-time characteristics of the signals appearing in the circuits of the preferred embodiment of the invention.

The circuit action of the phantastron circuit is similar to a Miller rundown circuit, except that the suppressor gate is taken from the screen grid network of the pentode 152. FIG. 10 illustrates typical phantastron wave forms created in the various circuits of a phantastron circuit connected like pentode 152 when a negative trigger pulse like curve E of FIG. 11 is coupled to the plate of the pentode. The pentode plate current is normally held cut off by the suppressor bias, so that all cathode current is absorbed by the screen grid. When the negative going synchronizing pulse, curve E, is coupled to the pentode plate, it provides a negative triggering pulse, 214, of FIG. 10, at said plate which is transferred to the control grid of the pentode by the capacitor 172. This decreases the cathode current of the pentode and allows the screen grid potential thereof to rise. (See portion 216 of screen voltage curve of FIG. 10.) Since the suppressor of the pentode is on the same bleeder network as the screen grid, the suppressor grid voltage also rises (see portion 218 of suppressor voltage curve of FIG. 10) and the plate current begins to flow thereby causing the plate voltage to fall (see portion 219 of plate voltage of FIG. 10).

The suppressor grid voltage rise 218 causes a further drop in the screen current. This further screen current drop causes a further rise in the screen and suppressor grid voltages 216 and 218 and a further rise in the plate current which causes the plate voltage 219 to fall further. This effect is regenerative, and the rise in screen voltage 216 is very fast.

At the same time that the screen voltage is rising, the plate voltage rundown 220 starts and continues until bottoming takes place, whereupon the control grid of the pentode 152 goes slightly positive and the cathode current increases. The increased cathode current increases the screen current slightly, causing the screen voltage to drop (see portion 224 of screen voltage curve FIG. 10), and consequently, a drop 226 in the suppressor grid voltage which tends to decrease the plate current which causes the plate voltage 227 to rise. Here again, the effect is regenerative and the screen voltage drops readily (see portion 224 of the screen voltage wave form illustrated in FIG. 10). The output of the pentode 152 is taken from the screen bleeder. This output pulse follows the general wave form of the screen voltage illustrated in FIG. 10. This output pulse has a width 228 which is controlled by setting the level at which the plate rundown of the pentode 152 of the phantastron circuit starts. In the case of pentode 152, this level is established and controlled by the voltage at the wiper of potentiometers 162 and 164, depending upon the position of the switch 160.

In the preferred embodiment of this invention, the voltages at the potentiometers 162 and 164 which are applied to the circuit through resistor 156 by the proper positioning of the switch 160 will be chosen so the width, i.e., the time span of the output pulse 229 of the phantastron circuit associated with the pentode 152 is as depicted by numeral 230 of curve F of FIG. 11. Depending upon the position of switch 160, the amount of selected control voltage fed to the plate of the pentode 152 through the isolating resistor 156, and the diode 168 can be controlled. The value of this selected control voltage determines where the plate rundown like numeral 220 of plate voltage characteristic of FIG. 10 of the phantastron circuit of pentode 152 starts and therefore the width 230 of the output 229. This width 230 is an indication of the time during which pentode 152 has an output. The output, curve F, of the pentode 152 is applied to the grids of the two cathode follower connected triodes 178 and 180. The output of the cathode follower connected triode 178 due to the curve F impressed upon its grid looks generally like curve G and its time interval is the same as that of curve F. This output of the triode 178 is applied to one input of the "and" gate circuit 112. The output of tube 180 also appears generally like the curve G and its time interval is also the same as that of curve F. This output of triode 180 drives the second gate phantastron circuit of pentode 190 in the following manner. It is differentiated by the differentiator circuit 182. The output of the differentiator circuit 182 appears like curve H and is coupled to the plate circuit of the pentode 190 of the second gate phantastron circuit through diode 192. Thus, the second gate phantastron circuit of pentode 190 which works in the same manner as the first gate phantastron circuit of the pentode 152 is triggered by the trailing edge 232 of the pulse 229 which is produced by the first gate phantastron circuit. As previously explained in the discussion of the operation of the phantastron circuit of pentode 152, the width of a phantastron output pulse is controlled by setting the level at which its pentode plate rundown starts. In the case of the phantastron circuit of the pentode 190, this level is established by potentiometers 200, 202, or 204, depending upon the position of switch 198.

For the purpose of further discussion of the operation of this invention, it will be assumed that the width of the output pulse 233 of phantastron circuit of the pentode 190 is as shown by numeral 234 of curve I. The width 234 of this output pulse 233 determines the length of the second or long-range sampling interval. In the preferred embodiment of this invention, the long-range sampling interval begins at the end of the short-range sampling interval, i.e., the output of the second gate generator 148 starts when the output of the first gate generator 146 ends. The output, curve I, of the phantastron circuit of pentode 190 is fed to the grid of the cathode follower connected triode 210, which in response to the positive going portion 233 thereof produces an output curve J which is applied to the second input of the "and" circuit 110.

Connected to the output of the "and" circuit 110 is a second gate or long-range integrator circuit 236. The long-range integrator circuit 236 is a simple resistance-capacitance "pi" network consisting of a resistor 238 and capacitors 240 and 242.

A first gate or short-range integrator circuit 244 is connected to the output of the "and" circuit 112. This integrator circuit 244 is a simple resistance-capacitance "pi" network including a resistor 246 and two capacitors 248 and 250.

When output signals like portions 140 and 142 of curve C appear at the video amplifier 92 output at the same time that a signal like curve G appears at the output of the first gate generator, a signal like curve K will be passed by the "and" gate circuit 112 to the first gate or short-range integrator 244. The widths 140s and 142s of the raised portions 140a and 142a of curve K represent the shadow lengths 134 and 136 caused by the same objects responsible for the raised portions 122 and 124 of curve A. With the input to the short-range integrator 244 like curve K, the output will be a D.C. voltage like curve L, the level of which corresponds to the radar shadow content of the portion of the video signal curve A between time=0 and time=X.

The second gate or long-range integrator 236 operates in substantially the same manner as the short-range integrator 244 in that when a signal like curve J exists at the same time a signal like portion 144 of curve C from the video amplifier 92 exists, said integrator will produce a D.C. voltage (see curve M) similar to curve L which corresponds to the radar shadow content of that portion 132 of the video signal A which caused said raised portion 144.

Connected to the output of the long-range integrator 236 is a long-range voltage comparator 252. The long-range voltage comparator 252 is a high-gain, direct-coupled, differential amplifier employing a special low-drift tube with balanced halves 254 and 256. The grid of half 254 is directly coupled with the output of the long-range integrator 236. The grid of half 256 is linked to a positive 200-volt source through a selective reference control 277 having potentiometers 280, 282 and 284 and a switch 278 (see FIG. 7).

Figure 6:
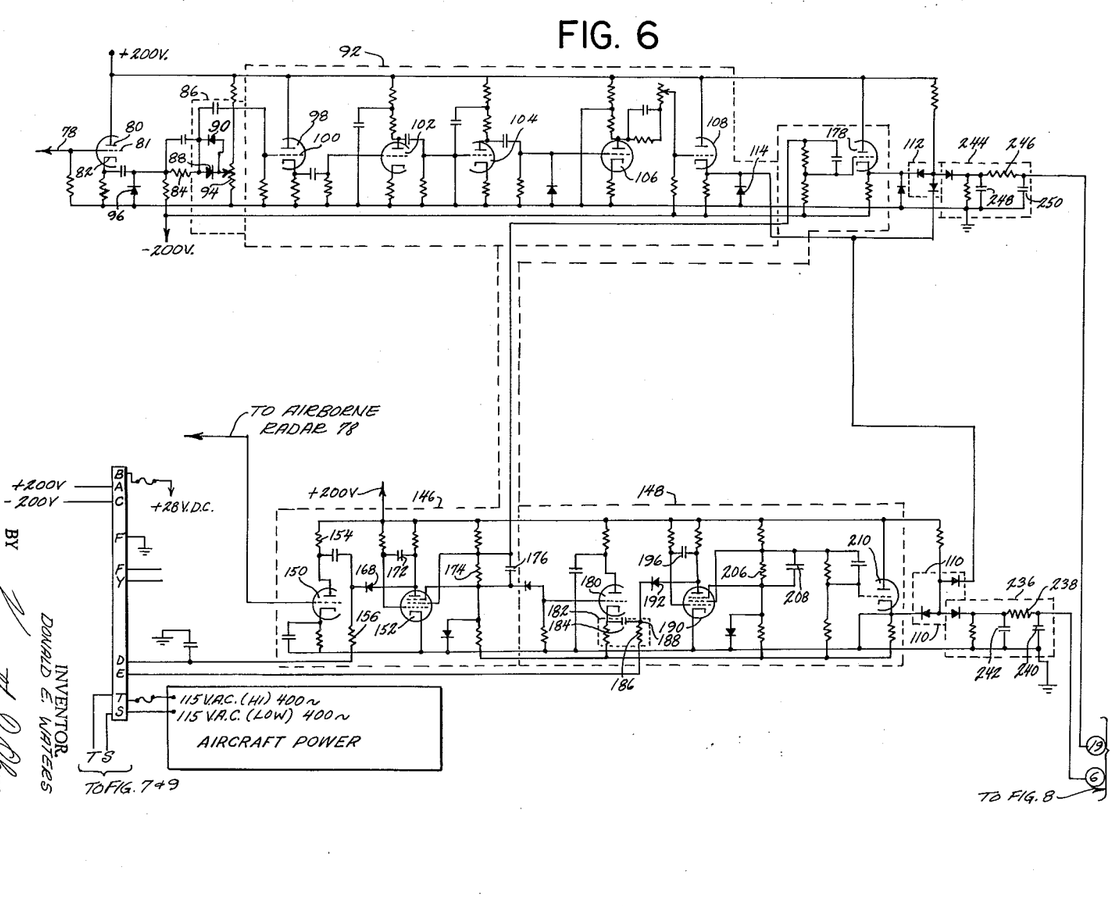
FIGS. 6, 7, 8 and 9, when properly oriented (i.e., when FIG. 6 is placed above FIG. 9 and when FIGS. 7 and 8 are placed to the left and right, respectively, of FIGS. 6 and 9), show a combined schematic diagram of a portion of the circuit of the preferred embodiment of the invention, said diagram showing the components of the terrain clearance system used in conjunction with a radar set. The connection between FIGS. 6, 9 and FIG. 7 are common capital letters appearing therein, while the connection between FIGS. 6, 9 and FIG. 8 are obtained through the terminals depicted by the common circled numbers appearing therein.
Figure 8:
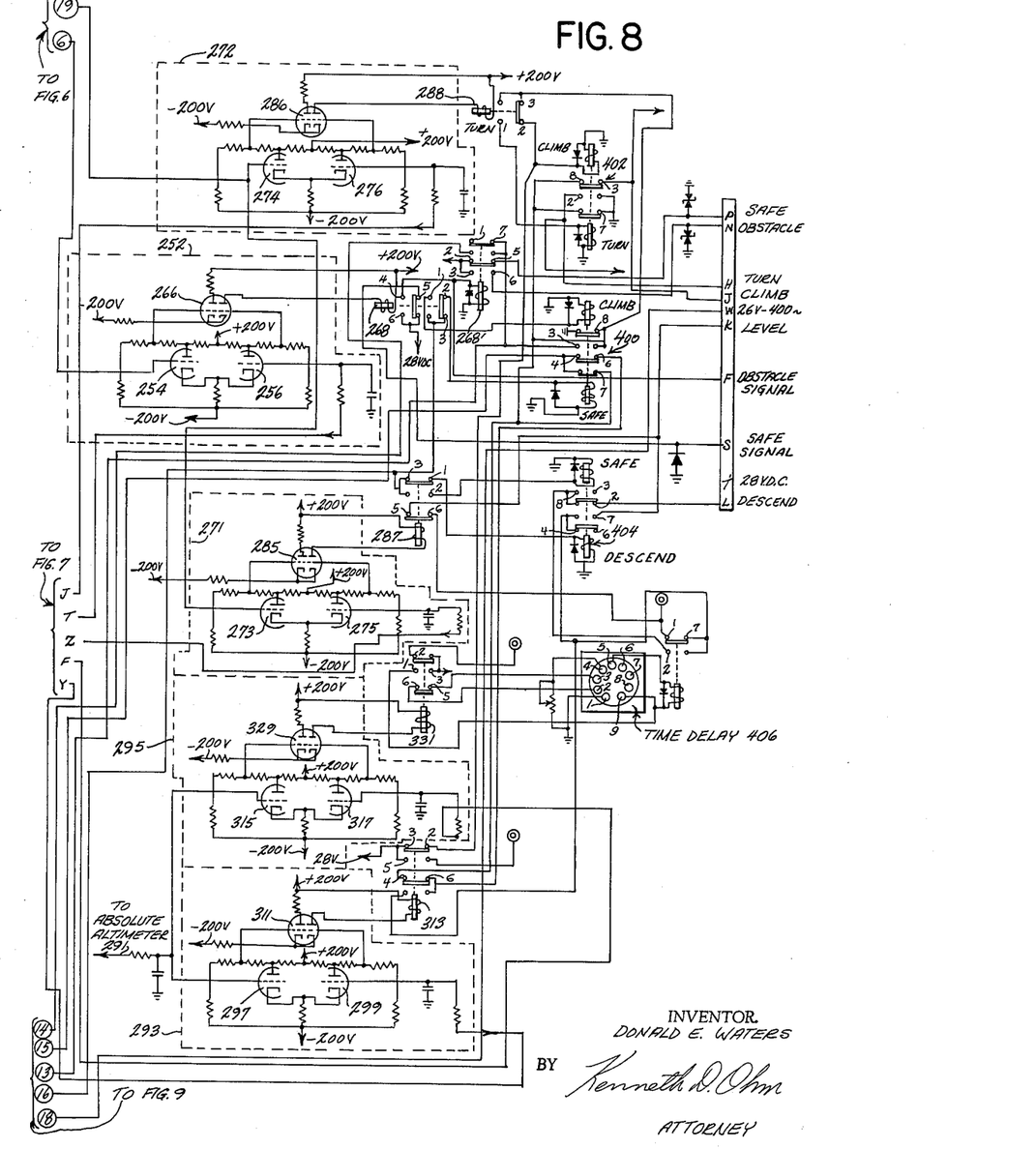
Figure 9:
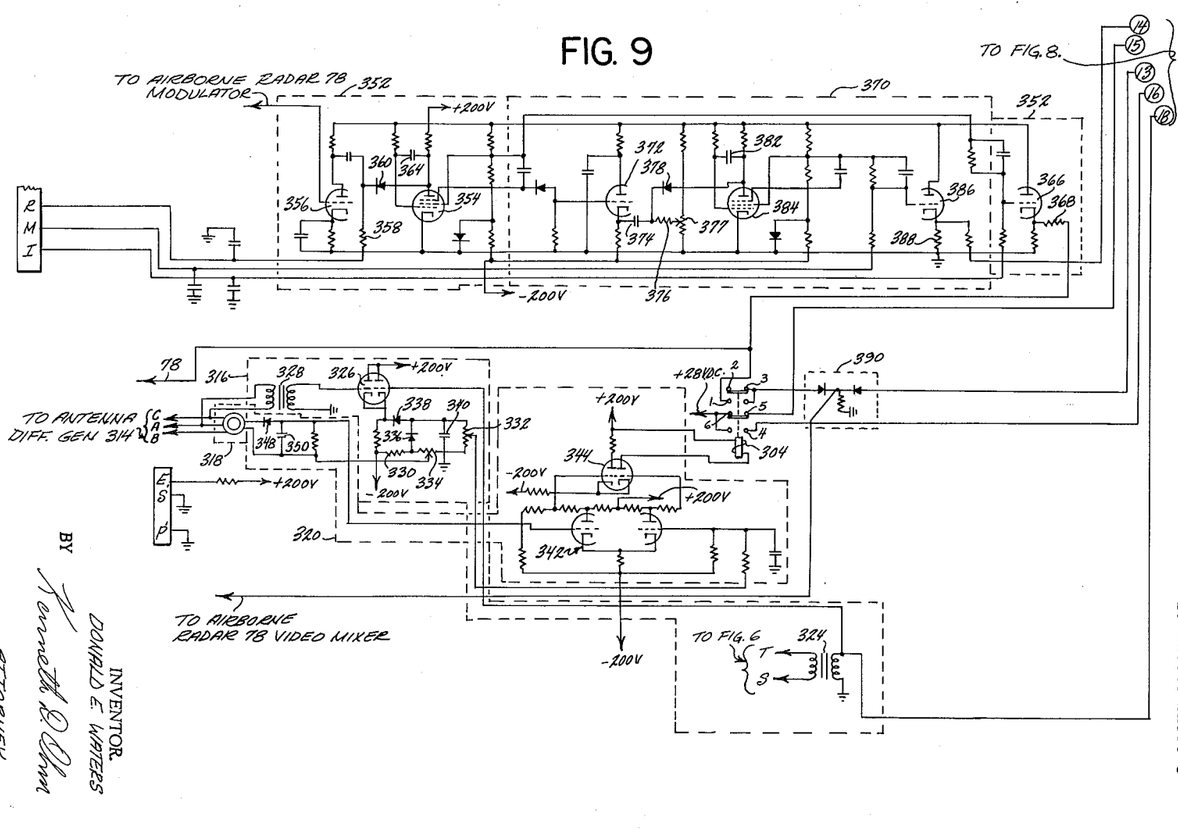

By correlating the network of FIG. 7 with the FIGS. 6, 8 and 9 it will be recognized that it provides bias voltages which control the output of the sector marker generator and the warning marker generator. Thus, the brightness of these displays on the PPI is controlled.

The plates of the halves 254 and 256 are directly coupled to the grids of a duo-triode relay tube 266. A relay 268 is connected in the plate circuit of one triode section of the relay tube 266.

Connected to the output of the short-range integrator 244 is a first voltage comparator 271 and a second voltage comparator 272. The first voltage comparator 271 includes a high-gain, direct-coupled, differential amplifier employing a special low-drift tube with balanced halves 273 and 275. The output of the integrator 244 is directly connected to the grid of half 273. The grid of half 275 is linked to a voltage supply of +200 volts by a selective reference control 265' having a switch 263 and potentiometers 257 and 259 (see FIG. 7).

The plates of the low-drift tube halves 273 and 275 are directly coupled to the grids of the duo-triode relay tube 285. A relay 287 is connected in the plate circuit of one triode section of the relay tube 285.

The second voltage comparator 272 of the first range gate includes a high-gain, direct-coupled, differential amplifier employing a special low-drift tube with balanced halves 274 and 276. The output of the integrator 244 is directly connected to the grid of half 274. The grid of half 276 is linked to a voltage supply of +200 volts by a selective reference control 265 having a switch 264 and potentiometers 258 and 260. (See FIG. 7.)

The plates of the low-drift tube halves 274 and 276 are directly coupled to the grids of the duo-triode relay tube 286. A relay 288 is connected in the plate circuit of one triode section of the relay tube 286.

The operation of the long- and the two short-range voltage comparators 252, 271 and 272 is quite similar. Therefore, only the operation of the long-range voltage comparator 252 will be discussed here. The output of the long-range integrator 236, which is a D.C. voltage, the magnitude of which depends upon the length of the radar shadows gated or passed to said integrator, is applied to the grid of the half 254 of the low-drift tube. In the preferred embodiment this voltage varies from zero to plus 20 volts.

A voltage is also supplied to the grid of tube half 256. The value of this voltage is controlled by switch 278, since the position of said switch determines which of the potentiometers 280, 282 or 284 will be placed in circuit between the positive voltage source and the grid of half 256. The voltages established by the potentiometers 280, 282 and 284 are equal to predetermined percentages of the voltage that would exist at the output of the long-range integrator 236, if the video signal A of FIG. 11 consisted entirely of shadow during the time of sampling interval such as the raised portion of curve J of FIG. 11. That is, the voltages established by the potentiometers 280, 282 and 284 can be made to equal predetermined percentages of the long-range integrator voltage which would be produced if the sampling gate like the raised portion of J mere completely filled with shadow. The aforementioned percentages are adjustable internally between zero and 100% of the gate width and are selected as a function of the clearance altitude desired.

The plates of the halves 254 and 256 are directly coupled to the grids of the duo-triode relay tube 266. The relay 268 of FIG. 8 is connected in the plate circuit of one triode section of tube 266. When the grid of said triode section is sufficiently more positive than the grid of the other triode section in tube 266, the relay 268 is actuated. The relay 268 is actuated when the voltage fed to the grid of half 254 from the long range integrator 236 exceeds the reference voltage applied to the grid of tube half 256.

The first voltage comparator 271 of the first, or short-range, gate with its switch 263 and associated potentiometers 257 and 259 and duo-triode 285 and relay 287 operates in substantially the same manner as the long-range comparator 252.

The second voltage comparator 272 of the first, or short-range, gate with its control switch 264 and associated potentiometers 258 and 260, and duo-triode 286 and relay 288 also operates in substantially the same manner as the long-range comparator 252.

An absolute altitude altimeter 291 such as an AN/APN–22 sold by Raytheon Company provides an output voltage signal indicative of the actual distance an aircraft like 16 is above the earth 36 at any given position of the aircraft.

Connected to the output of the absolute altimeter is a lower limit voltage comparator 293 and an upper limit voltage comparator 295. The lower limit comparator 293 includes a high-gain, direct-coupled, differential amplifier employing a special low-drift tube with balanced halves 297 and 299. The output of the absolute altimeter 291 is directly connected to the grid of the half 297. The grid of half 299 is linked to a voltage supply of +200 v. by a selective reference control 301 having a switch 303 and potentiometers 305, 307 and 309 (see FIG. 7).

The plates of the low-drift tube halves 297 and 299 are directly coupled to the grids of a duo-triode relay tube 311. A relay 313 is connected in the plate circuit of one triode section of the relay tube 311.

The upper limit comparator 295 includes a high-gain, direct-coupled, differential amplifier, employing a special low-drift tube with balanced halves 315 and 317. The output of the absolute altimeter 291 is directly connected to the grid of half 315. The grid of half 317 is linked to a voltage supply of +200 v. by a selective reference control 319 having a switch 321 and potentiometers 323, 325 and 327 (see FIG. 7).

The plates of the low-drift tube halves 315 and 317 are directly coupled to the grids of the duo-triode relay tube 329. A relay 331 is connected in the plate circuit of one triode section of the relay tube 329.

The lower limit voltage comparator 293 with its control switch 303 and associated potentiometers 305, 307 and 309, and duo-triode 311 and relay 313, and the upper limit voltage comparator 295 with its control switch 321 and associated potentiometers 323, 325 and 327, and duo-triode 329 and relay 331 operate in substantially the same manner as the long-range comparator 252.

When relays such as 268 and 288 are activated, it means that an aircraft like 16 may not clear by a predetermined desired altitude some obstacle in the path of the transmitted narrow beam radar pulse. When relay 313 is de-activated, it means that the aircraft 16 is below a first predetermined altitude above the ground and when relay 331 is de-activated, it means that the aircraft 16 is above a second predetermined altitude above the ground. When relay 287 is de-activated, it means that the aircraft may well clear by more than a predetermined altitude all obstacles in the path of the transmitted narrow beam radar pulse. To be of use, this information must be made available to those who control the aircraft. Therefore, this invention provides a number of instruction circuits, the operation of which will now be described in some detail.

Contact 268–1 of the long-range relay 268 of FIG. 8 is connected to the climb coil of a climb-safe magnetic latching relay 400, while contact 268–2 is connected to the safe coil of relay 400. Contact 288–1 of the second comparator relay 288 of the short-range gate of FIG. 8 is connected to the turn coil of a turn-climb magnetic latching relay 402, while contact 288–2 is connected to the climb coil of relay 402. Contact 287–1 of the first comparator relay 287 of the short-range gate of FIG. 8 is connected to the descend coil of a descend-safe magnetic latching relay 404, while contact 287–2 is connected to the safe coil of relay 404. Contacts 331–1, 331–5 and 331–6 of the upper limit relay 331 of FIG. 8 are connected to pins 9, 3 and 2, respectively, of a time delay 406. Time delay 406 is a static timer such as Static Timer Switch 90095 sold by Tempo Instrument, Inc.

The relays 268, 288, 287, 331, 313, 400, 402, 404 and time delay 406 are interconnected, energized and de-energized as shown in FIGS. 6–9 so as to provide electrical signals indicative as to whether an aircraft should climb, turn, descend or continue in level flight in order to stay a predetermined height above the ground along its intended flight path. These electrical signals are obtained as follows. If the radar shadows in the second or long-range gate exceed some value, Y, relay 268 is actuated and provides an electrical signal at junction J of FIG. 8 indicating that the aircraft should climb. If the absolute altitude falls below a lower limit, LL, the lower limit relay 313 is de-energized and provides an electrical signal at junction J of FIG. 8, indicating that the aircraft should climb. If the radar shadow in the second gate exceeds Y and the shadow in the first or short range gate exceeds some value, U, relay 288 is actuated and provides an electrical signal at junction H of FIG. 8, indicating that the aircraft should turn.

Figure 12:
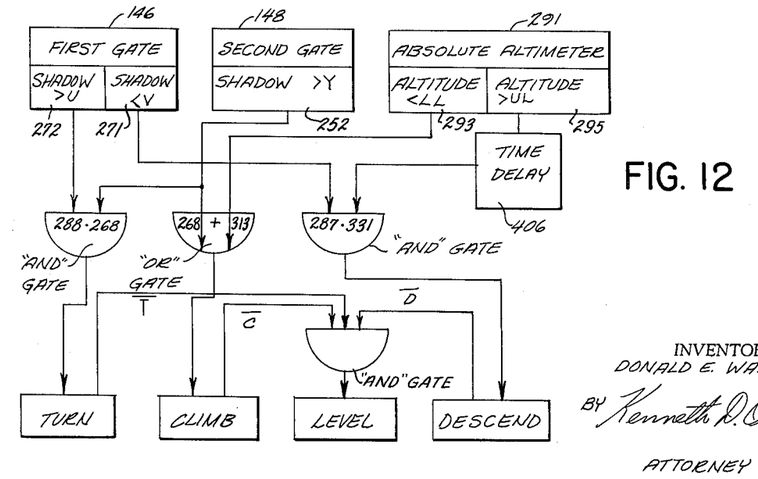
FIG. 12 is a block diagram of system logic of the present invention.

When the absolute altitude becomes greater than an upper limit, UL, the upper limit relay 331 is actuated. This starts the time delay 406. The primary function of the time delay 406 is to prevent descents into holes in the ground such as small canyons, etc. Thus, at the end of the time delay period provided by time delay 406, if the upper limit relay 331 is still de-activated and the relay 287 is actuated by the fact that the shadow in the first gate is less than some value, V, then, if no climb or turn signal exists, an electrical signal is provided at junction L of FIG. 8, indicating that the aircraft should descend. If there is no electrical signal indicating either turn, climb, or descend, an electrical signal appears at junction K of FIG. 8, indicating that the aircraft should continue in level flight. The level signal will appear only when the aircraft is between the upper and lower limits, UL and LL, of the altimeter and there is not enough shadow in the second gate to actuate relay 268. The above system logic is shown in the form of a block diagram in FIG. 12. The $\overline{T}$ indicates that no turn signal is present; the $\overline{C}$ indicates no climb signal; the $\overline{D}$ indicates no descent signal. FIGURE 12 is a logical information flow diagram representative of the manner in which information passes to and from the various circuits of the preferred embodiment of the invention illustrated in block diagram form in FIGURE 5. One skilled in the art, upon comparison of the logical flow diagram of FIGURE 12 with the block diagram of FIGURE 5, will immediately recognize that the diagram of FIGURE 12 generically illustrates the cooperative relationship between the circuits of the invention necessary to produce the TURN, CLIMB, LEVEL, and DESCEND signals. More particularly, the TURN "AND" gate of FIGURE 12 represents the relays 268 and 288 in the preferred embodiment illustrated in FIGURE 5. The TURN "AND" gate is responsive to input signals from the shadow voltage comparator circuit 252 and the shadow voltage comparator circuit 272. When both relays 268 and 288 are actuated, a TURN signal, described above and hereafter more fully illustrated, is produced. Similarly, the DESCEND "AND" gate illustrated in FIGURE 12 represents the relays 287 and 331 in the preferred embodiment of the invention illustrated in FIGURE 5. The relays 287 and 331 operate in response to signals produced by the shadow voltage comparator circuit 271 and altitude voltage comparator circuit 295, respectively, to pass a DESCEND command signal. The CLIMB "OR" gate illustrated in FIGURE 12 represents in the preferred embodiment of the invention shown in FIGURE 5, the relays 268 and 313. If a signal is produced by the shadow voltage comparator circuit 252 so as to actuate the relay 268 or by the altitude voltage comparator circuit 293 so as to actuate the relay 313, a CLIMB signal is passed by the CLIMB "OR" gate. On the other hand, in the absence of a TURN signal, a CLIMB signal and a DESCEND signal, respectively represented by the symbols $\overline{T}$, $\overline{C}$, and $\overline{D}$, the aircraft in which the present invention is employed receives a LEVEL command signal, as indicated by the LEVEL "AND" gate shown in FIGURE 12. The significance of the TURN, CLIMB, DESCEND, and LEVEL command signals will be understood from the descriptions which hereinafter follow.

Because the radar antenna normaly operates in a scanning mode through 360° (see the radar return depicted in FIG. 4), the relays 268, 288, 287, 313 and 331 must be enabled (permitted to provide the electrical instruction signals at junctions H, J, K and L of FIG. 8) only when the radar antenna is in a position corresponding to the desired proposed aircraft direction of flight.

The function of insuring that the relays 268, 287, 288, 313 and 331 are enabled only for that portion of the radar return which is created by the obstacles lying in the intended path of the aircraft is accomplished by the sector enable relay 304 in conjunction with the following circuits, an antenna differential generator 314 (shown in FIG. 5), a zero set synchro 315 (shown in FIG. 5), a phase detector 316, a synchro control transformer 318, and a voltage comparator 320. A reference voltage source 322 supplies the antenna differential generator 314 through a zero set synchro 315 and the phase detector 316 with power.

The phase detector 316 includes includes a transformer 324, a duo-triode 326, a second transformer 328, a resistor 330, two potentiometers 332 and 334, two diodes 336 and 338, and a capacitor 340. The grid of one-half of the tube 326 is referenced to ground through the secondary winding of the transformer 324. The grid of the other half of the tube 326 is referenced to ground through the secondary winding of the transformer 328. The primary of said transformer 328 is connected to one phase of the three-phase output of the antenna differential generator 314. The resistor 330 and the potentiometer 334 are connected in series between a negative voltage and ground. The diodes 336 and 338 are series connected between the common junction of the resistor 330 and the potentiometer 334 and the cathodes of the tube 326. The potentiometer 332 is in parallel connection with the series connected potentiometer 334 and diode 336 and the capacitor 340.

The voltage comparator 320 includes a duo-triode 342, a duo-triode 344, a diode 348 and a capacitor 350. One grid of the duo-triode 342 is coupled to the potentiometer 332 of the phase detector 316. The other grid of the duo-triode 342 is coupled to the output of the synchro control transformer 318. The diode 348 and the capacitor 350 are connected to provide a rectifier and filtering circuit between the output of the synchro control transformer 318 and the second grid of the duo-triode 342. The plates of the duo-triode 342 are coupled to the grids of the duo-triode 344. The enable relay 304 is connected in the plate circuit of one triode section of the duo-triode 344.

The synchro transformer 318 has three input lines which connect it with the antenna differential generator 314 and two output lines which connect it to the voltage comparator 320. The antenna differential generator 314, the zero set synchro 315, the synchro control transformer 318, the phase detector 316, the voltage comparator 320, and the reference voltage source 322 operate as follows to insure that the portion of the radar return, such as that lying between lines 60 and 62 of FIG. 4, being analyzed by this terrain clearance adapter and capable of actuating the relays 268, 288, 287, 313 and 331 is that portion of said radar return which is created by the terrain lying along the proposed course of the aircraft. The reference voltage source 322 supplies the zero set synchro 315 and the primary winding of transformer 324 of the phase detector 316 with the same reference voltage. As is well known in the art, the zero set synchro 315 supplies the antenna differential generator 314 with three-phase current. Based on this three-phase current, said antenna differential generator can supply three-phase current to the synchro control transformer 318 which is indicative of the position of the antenna of radar 78, since said antenna is coupled by gears (see FIG. 5) to the movable core of said antenna differential generator. One phase of the three-phase output of the antenna differential generator 314 is applied to the primary of the second transformer 328. The phase of the voltage developed by the secondary of transformer 324 is fixed due to the connection of the primary thereof to the voltage reference 322 while the phase of the voltage out of the transformer 328 reverses 180° with each half revolution of the radar antenna. Thus, the voltage applied to the grids of the duo-triode 326 are in phase during one portion of each revolution of the radar antenna. As is readily apparent from FIG. 9, the individual triodes of the duo-triode 326 are operated as cathode followers with a common cathode load. This load is referenced to —200 volts. Provided that either of the control grids of the duo-triode are positive, the cathode potential also will be positive. Therefore, when the two grid signals are out of phase, the cathode potential is never negative because, at any instant, at least one of the control grids is not negative. When the voltages of the two transformers 324 and 328 are in phase, the grids go negative at the same time, and the cathode potential likewise goes negative. The cathode voltage can go negative to the value which exists at the common junction of resistor 330 and potentiometer 334, whereupon diode 336 conducts and prevents a further decrease in voltage. The voltage appearing at the junction of the two diodes 336 and 338 is preferably limited over a range between zero and approximately —6.5 volts. This voltage is filtered by the capacitor 340, and a relatively smooth D.C. voltage is thereby applied through the sector width control potentiometer 332 to one input of the duo-triode 342 of the voltage comparator 320.

The other input of the voltage comparator 320, i.e., the voltage applied to the second grid of the duo-triode 342, is obtained from the rotor of the synchro control transformer 318. The output of the synchro control transformer 318 which is derived from the input supplied thereto by the antenna differential generator 314 is rectified by the diode 348 and filtered by the capacitor 350 before reaching the second grid of the duo-triode 342. Because of the connection between duo-triodes 342 and 344, signals impressed upon the grids of duo-triode 342 affect the signals impressed upon the grids of duo-triode 344. Thus, the voltage difference, if any, between the grids of duo-triode 344 is dependent upon the two inputs to the voltage comparator 320, one of which is from the phase detector 316 and the other from the synchro control transformer 318. When the right grid of the duo-triode 344 is more positive than the left grid thereof, the right triode section of said tube conducts, thereby actuating the sector enabling relay 304 to close the circuits between contacts 304–1 and 304–3 and between contacts 304–4 and 304–6 thereof. Therefore, when the phase detector 316 produces a negative voltage (as a result of the antenna being in the correct half circle), and the synchro control transformer 318 produces a null (as the result of the antenna being aligned with the position established by the control transformer 318) the voltage comparator 320 actuates the sector enabling relay 304.

It is thus readily apparent that the output of the synchro control transformer 318 can be made zero when the radar antenna 78 is aligned with the intended flight path of the aircraft. Without cross winds, the synchro control transformer 318 output is set for zero degrees drift, i.e., the output of the transformer is set to be zero when the radar antenna 78 is aligned with the center line of the aircraft. In this situation the center line of the aircraft indicates the intended flight path of the aircraft. With cross winds which produce a drift angle, the synchro control transformer 318 output is set to be zero when the radar antenna 78 corresponds to the drift angle, i.e., the output of the transformer is set to be zero when the radar antenna is aligned with the actual flight path of the aircraft. In this way the apparatus compensates for the difference between the aircraft heading and the actual aircraft flight path which is caused by the cross winds. For this reason the rotor of the synchro control transformer 318 is adjustable to give a zero output for antenna positions up to 45° to the right or to the left of the centerline of the aircraft.

In addition to enabling the relays 268, 288, 287, 313 and 331 to produce electrical voltage signals indicative as to whether the aircraft should climb, turn, descend, or continue in level flight, the circuit herein described modifies the PPI display of the radar system in such a way that all alternate courses scanned by the antenna are displayed (see FIG. 4). Indications in this display as to whether or not the alternate courses are safe are generated by a marker generator 351 comprising a sector marker generator 352 and a warning marker generator 370. The warning marker generator 370 is connected to the airborne radar 78 through the sector marker generator 352. The sector marker generator 352 includes principally a screen coupled monostable phantastron circuit with a pentode 354, a triode 356, a warn mark position resistor 358, a diode 360, a capacitor 364, a triode 366, and a resistor 368. These various circuit elements are assembled to provide a circuit very similar to that of the first gate generator 146.

Coupled to one output of the sector marker generator 352 is the warning marker generator 370. The warning marker generator 370 includes a triode 372, a capacitor 374, in series with a resistor 376, a warn mark width potentiometer 377, a diode 378, a capacitor 382, a pentode 384, a triode 386, and a resistor 388. These particular elements are assembled in a screen coupled monostable phantastron circuit very similar to the circuit of the second gate generator 148. The output of the warning marker generator 370 is linked to contact 268′-2 of the long range relay 268′. Contact 268′-7 of relay 268′ is connected to one input of two-input "or" circuit 390. The output of the "or" circuit 390 is connected to a video mixer 392 of the radar system 78. The other input of the "or" circuit 390 is coupled to the output of the sector marker generator 352 through contacts 304-1 and 304-3 of the enable relay 304.

In operation the circuits of the sector marker generator 352 and the warning marker generator 370 function in substantially the same manner as the first gate generator 146 and the second gate generator 148 previously described. More particularly, when a radar pulse such as curve D of FIG. 11 is emitted by the radar 78, there is a video signal return like curve A. At the instant the radar pulse, curve D, is transmitted by the radar 78, a radar synchronizing pulse is impressed upon tube 356. The output of tube 356 is coupled through the diode 360 to the plate circuit of the pentode 354. As previously described in the operation of phantastron circuit involving the pentode 152, the width of the pulse (see width 288 of screen voltage curve of FIG. 10) generated by a phantastron circuit such as that associated with pentode 354 is established by the voltage supplied through a resistor like 358 connected to a diode like 360. The length of this output pulse which is similar to portion 228 of the screen characteristic illustrated in FIG. 10 determines the distance from the center of the display (FIG. 4) of the airborne radar set 78 out to the marker lines 71. In the preferred embodiment of this invention, it is desired to keep the marker lines 71 close to the edge of the radar display. The output of the phantastron circuit of the pentode 354 is coupled to the video mixer 392 of the radar 78 through the cathode follower connected triode 366 and contacts 304-1 and 304-3 of the enable relay 304 to provide an indication of the sector being scanned. This sector is displayed on the PPI presentation of FIG. 4 as a wedge or narrow brightened sector 396 between lines 60 and 62 and extend from the center, or sending and receiving area, to the marker lines 71.

At the same time the output of the phantastron circuit of the pentode 354 is also coupled to the warning marker generator 370. Said output is differentiated by the differentiator circuit consisting of the capacitor 374 and the resistor 376. The negative output pulse of said differentiator, which coincides in time with the trailing edge of the signal, is coupled to contact 304-1 of the relay 304 through diode 378 to the plate of the phantastron circuit of pentode 384. Like the second gate generator 148, the warning marker generator 370 is triggered by the trailing edge of the pulse generated by the preceding phantastron circuit of pentode 354. The width of the pulse generated by phantastron circuit of the pentode 384 is controlled by the potentiometer 377. This pulse is used to modify the PPI display of the airborne radar 78 in that the width of this pulse establishes the width of the warning marker lines 71.

The output of the phantastron circuit of pentode 384 is coupled to the grid of the cathode follower connected triode 386. The output of this cathode follower 386, in turn, is applied through contacts 268′-2 and 268′-7 of the long-range relay 268′ which is controlled by the long-range relay 268 to one input of the two input "or" circuit 390. The output of the "or" circuit 390 is fed directly to the video mixer 392 of the radar system 78 when the circuit between contacts 268′-2 and 268′-7 is closed. This is accomplished when the long range relay 268′ is actuated by relay 268 due to a dangerous object in the vicinity of the aircraft as previously described. Thus, the warning mark lines 71 will appear on the PPI display (FIG. 4) of the airborne radar only upon a coincidence of warning mark pulses 71 from the warning marker generator 370 and the closure of the long range alarm relay 268′.

The pulse output of the phantastron circuit of pentode 354 of the sector marker generator 352 is coupled to the grid of the triode 366. This triode 366 feeds the other input of the "or" circuit 390 through contacts 304-1 and 304-3 of the sector enable relay 304 when the circuit between said contacts is closed. This circuit will be closed when the relay 304 is actuated. The manner in which said relay becomes actuated and remains so has been previously described. Thus only during the coincidence of a sector brightness pulse from sector marker generator 352 and the closure of the circuit between contacts 304-1 and 304-3 will an electric signal appear at the output of "or" circuit 390 and will the pedestal or overall brightness of the radar video signal be raised. The raising of the brightness of this signal portrays a bright wedge 396 of FIG. 4 on the PPI which corresponds to the sector being scanned at that particular moment.

A power supply (not shown) supplies the various voltages and currents necessary to operate the invention diagrammatically illustrated in FIGS. 6–9. More specifically, power source 398′, supplies the power necessary to provide the electrical signals indicative of the climb, turn, descend, and continue level flight instructions. The various elements which compose the power supply are well known in the art and therefore need not be discussed in any further detail.

A pilot indicator 500 visually displays instructions based on the radar shadows being analyzed by the terrain clearance system circuits. As previously mentioned, these radar shadows provide electrical signals which indicate whether an aircraft should climb, turn, descend, or continue in level flight in order to remain a predetermined distance above the terrain along its intended path of flight. In addition, these shadows provide at terminals F, S, N and P of FIG. 8 electrical signals indicative of whether any or all of the alternate courses scanned by the radar antenna are safe, i.e. whether there is a dangerous obstacle along the path of any of the alternate courses. An obstacle signal is provided at terminals F and N whenever the radar echo received by the radar antenna as it scans indicates that there is a dangerous obstacle present. A safe signal is provided at terminals S and P whenever there is no obstacle signal at terminal N.

The pilot indicator 500 comprises a motor brake assembly 502 (FIG. 14) which provides for visual observation of one of the flight instructions (i.e., turn, climb, decend, level) and an electromagnetic reed assembly 504 (FIG. 16) which provides for observation a visual display indicative of the safeness of all headings 90° to the left or right of the present heading of the aircraft. The pilot's indicator has a black surface plate 499 with an instruction window 501 and a warning sector window 503. Behind the warning sector window 503 is a white background display panel 505.

Figure 14:
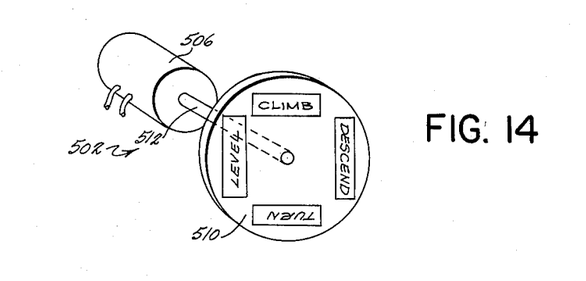
FIG. 14 is a perspective view of a motor brake disc assembly which presents the proper instruction in the instruction window of the pilot's indicator.
Figure 16:
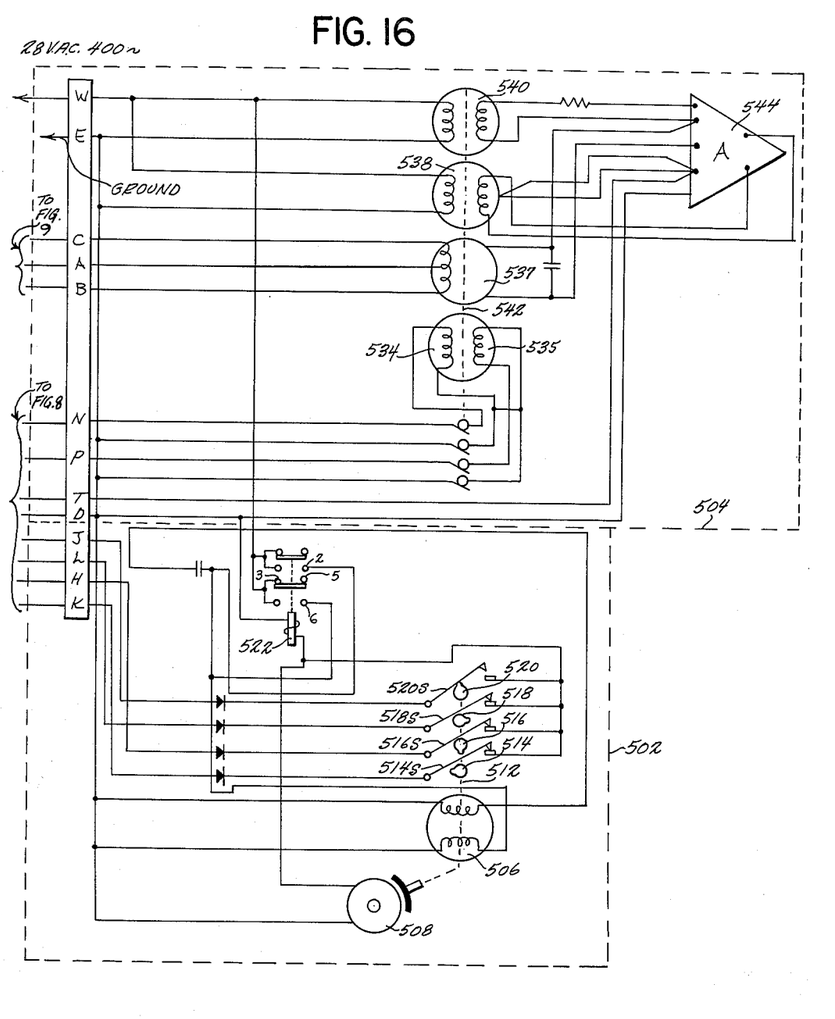
FIG. 16 is a schematic diagram of the circuit of the preferred embodiment of the pilot's indicator.

The motor brake disc assembly 502 comprises an electric motor 506, an electromagnetic brake 508, and a circular disc 510 (FIGS. 14 and 16). The motor 506 drives a shaft 512 which has mounted thereon four cam members 514, 516, 518, and 520 (see FIG. 16). When any one of these cams is in its upright position (i.e. like the position of cam 520), it disconnects its associated switch 514s, 516s, 518s, and 520s. The disc 510 is securely fastened to the shaft 512 in such a manner that the term "climb" appears in the window 501 of the pilot indicator 500 when switch 520s is disconnected. In like manner, the term "descend" appears in the window 501 when the switch 518s is disconnected, the term "turn" appears in the window 501 when the switch 516s is disconnected, and the term "level" appears in the window 501 when the switch 514s is disconnected.

In operation, the motor 506 rotates the disc 510 whenever the brake 508 permits. For example, when a signal appears at terminal J of FIG. 16 and if the switch 520s is closed, the relay 522 and the brake 508 will be actuated. When relay 522 is actuated, the motor 506 will be energized and rotate the disc 510. The disc 510 will continue rotating until the cam 520 disconnects the switch 520s. Disconnecting switch 520s de-energizes the relay 522 and the brake 508 which, in turn, stops the motor 506. Since the cam 520 disengages the switch 520s when the term "climb" appears in the window 501, there will be present in the pilot's indicator panel a visual indication of the presence of the climb signal at terminal J. In like manner, when a change of instructions occurs, electrical signals indicative of "descend," "turn," or "continue in level flight" appear at terminals L, H and K, respectively. Which ever one of these signals appears will be applied to the motor brake through its associated closed switch 518s 516s, or 514s. This will drive the motor 506 and cause the disc 510 to rotate until the instruction corresponding to the signal causing the motor to rotate appears in the window 501. When this occurs the switch associated with this signal will be opened by the cam associated with the matching instruction and the brake 508 will be actuated.

Figure 13:
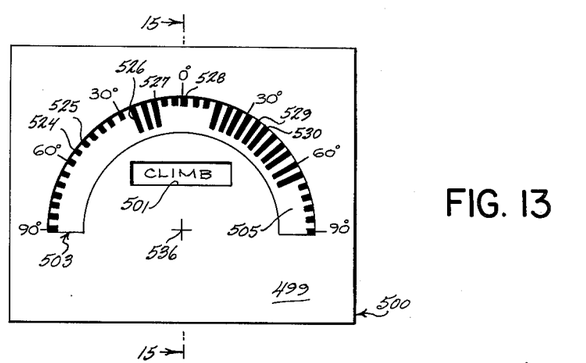
FIG. 13 is a front view of a pilot's indicator for visually displaying instructions derived from the radar returns analyzed by the disclosed circuits.

The electromagnetic reed assembly 504 comprises a plurality of balanced reeds some of which are depicted by numerals 524–530. Each of these reeds has a danger and safe position. When the reeds are in their danger position, they are substantially withdrawn from view in the warning sector window 503 (FIG. 13) like reeds 524, 525 and 528. When the reeds are in their danger position, the portions of the white display panel 505 positioned behind such reeds are visible through the window 503. When the black reeds are in their safe position, they are substantially fully visible in the warning sector window 503 like reeds 526, 527, 529 and 530.

Figure 15:
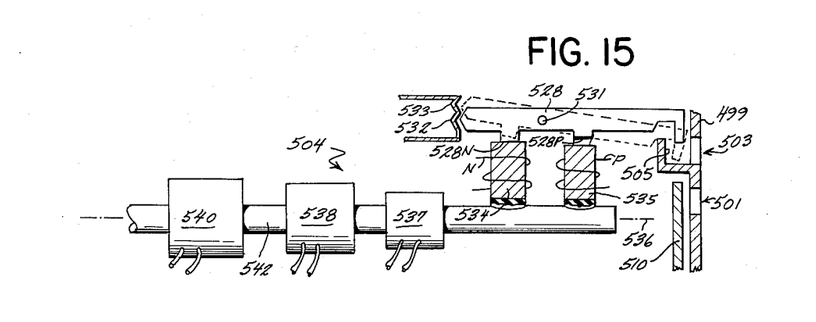
FIG. 15 is a partial section taken along lines 15—15 of FIG. 13.

Each of the reeds is mounted like reed 528 shown in FIG. 15. Reed 528 is mounted on an arm to pivot about a point 531. One end of the arm of reed 528 engages a detent 532 when the reed is in its danger or obstacle position as shown in solid lines, and the detent 533 when the reed is in its safe or no obstacle position which is shown in dotted lines.

The detents 532 and 533 hold the reed 528 in either its solid line or dotted line position while at the same time permitting it to move between these positions when acted upon by some outside force. This outside force is applied by a pair of electromagnets 534 and 535 which are not only associated with the reed 528, but also are successively associated with all of the reeds as the electromagnets rotate about axis 536. These electromagnets are driven by a servo motor 538 (FIG. 16) and rotate in synchronism with the radar antenna. The electromagnets 534 and 535 are only as wide as the reed 528. As the electromagnets 534 and 535 rotate about the axis of rotation 536, they pass below extensions 528N and 528P of the reed. As the electromagnets 534 and 535 pass each individual reed, such as reed 524–530, each reed will either retain the position it is then in or shift to its other position, depending upon which electromagnet is energized. Thus, if electromagnet 535 is energized when it passes a particular reed, said reed will be moved to its dotted line position or if it is already in its dotted line position, it will remain there; while if electromagnet 534 is energized when it passes said individual reed, the reed will be moved to its solid line position or if it is already in its solid line position, it will remain there.

The electromagnets 534 and 535 are energized when signals appear at the terminals N and P, respectively, in FIG. 16. As previously mentioned, a signal appears at terminal N any time the scanning radar return indicates a dangerous obstacle, while a signal appears at terminal P whenever there is no signal at terminal N. FIG. 16 shows that the electromagnets 534 and 535 are connected to a synchro 537, a motor 538, and generator 540 by a shaft 542. The synchro 537, the motor 538, and the generator 540 are connected in circuit with a servo amplifier 544. As is well known in the art, the circuit of FIG. 16 will insure that the electromagnets 534 and 535 rotate in coincidence with the scanning radar antenna. Thus, when the electromagnets 534 and 535 position any one of the reeds, such as 524–530 in their danger position (i.e., up), this will mean that at the heading corresponding to the position of said reed in the warning sector window 503 there is a dangerous obstacle. When the electromagnets 534 and 535 position any one of the reeds, such as 524–530, in their safe position (i.e., down) this will mean that at the heading corresponding to the position of said reed in the warning sector window 503 there are no potentially dangerous obstacles within the range of the radar. Thus, the pilot's indicator 500 in combination with the various circuits shown and described herein provides a means for visually indicating whether an aircraft should climb, descend, turn or continue in level flight, and if it should turn, what new heading should be assumed that will be safe and can be assumed with the least deviation from the old heading.

Although the preferred embodiment of the invention disclosed herein refers to specific electrical equipment for obtaining intelligible information from radar return signals relative to the height of objects responsible for said return signals, it should be understood that the invention is in no way limited to the specific embodiment set forth herein.

What is claimed:

1. A terrain clearance system for use with an airborne radar set which can produce an "A" scope type of signal indicative of the radar shadow contained in the radar return received by said radar set comprising signal circuit means connecting said scope to said radar set, integrating means for said "A" scope signal and providing a first signal indicative of the amount of said radar shadow, absolute altimeter means for providing a second signal indicative of the absolute altitude of said radar set, and means for providing a third signal when said first and second signals simultaneously differ by at least preset amounts from predetermined reference signals.

2. A terrain clearance system for use with an airborne radar set which can produce an "A" scope type of signal indicative of the radar shadow contained in the radar return received by said radar set comprising circuit means connecting said scope to said radar set, circuit means for integrating said "A" scope type signal and providing a first signal indicative of the amount of said radar shadow, means for comparing said first signal with a first reference signal and providing a second signal indicative of a difference between said first signal and said first reference signal when said signals differ by at least a preset amount, absolute altimeter means for providing a third signal indicative of the absolute altitude of said radar set, means for comparing said third signal with a second reference signal and providing a fourth signal indicative of a difference between said third signal and said second reference signal when said signals differ by at least a certain amount, and relay and circuit means for providing a fifth signal when said second and fourth signals occur simultaneously.

3. A terrain clearance system for use with an aircraft radar set which can produce an "A" scope type of signal indicative of the radar shadow contained in the radar return received by said set comprising circuit means for integrating said "A" scope type signal to provide a first signal indicative of the amount of said radar shadow circuit means for comparing said first signal with a first reference signal and providing a second signal whenever said reference signal exceeds said first signal, absolute altimeter means for providing a third signal indicative of the absolute altitude of the aircraft, circuit means for comparing said third signal with a second reference signal and providing a fourth signal whenever said reference signal exceeds said second reference signal, and relay and circuit means for providing a fifth signal when said second and fourth signals occur simultaneously.

4. A terrain clearance system as set forth in claim 3 including a delay means associated with the relay and circuit means so that the fifth signal will only be provided when both said second and fourth signals occur simultaneously for longer than a predetermined period of time.

5. A terrain clearance system as set forth in claim 4 in which a display containing at least a first visual instruction is connected to said relay and circuit means so that when said fifth signal occurs said display is actuated until the aircraft reaches a predetermined position.

6. A terrain clearance system for use with an airborne radar set which can produce an "A" scope type of signal indicative of the radar shadow contained in the radar return received by said radar set comprising means for gating a first predetermined portion of said "A" scope type signal, means for integrating said first gated portion to provide a first signal indicative of the amount of radar shadow contained in said first gated portion, means for comparing said first signal with a first reference signal to provide a turn signal when said first signal exceeds said first reference signal, means for comparing said first signal with a second reference signal to provide a first descend signal when said second reference signal exceeds said first signal, means for gating a second predetermined portion of said "A" scope type signal, means for integrating said second gated portion to provide a second signal indicative of the amount of radar shadow contained in said second gated portion, means for comparing said second signal with a third reference signal to provide a first climb signal when said second signal exceeds said third reference signal, absolute altimeter means for providing a third signal indicative of the absolute altitude of said radar set, means for comparing said third signal with a fourth reference signal to provide a second climb signal when said fourth reference signal exceeds said third signal, means for comparing said third signal with a fifth reference signal to provide a second descend signal when said third signal exceeds said fifth reference signal, first logic means which provides a climb instruction signal upon the occurrence of at least one of said climb signals, second logic means which provides a turn instruction signal when said first climb signal and said turn signal occur simultaneously, third logic means which provides a descend instruction signal when a climb instruction signal is not provided and when said first and second descend signals occur simultaneously.

7. A terrain clearance system as set forth in claim 6 including a fourth logic means which provides a level instruction signal in the absence of all of said three possible instruction signals mentioned in claim 6.

8. A terrain clearance system as set forth in claim 7 including means connected to each of said four logic means for visually displaying said level, climb, turn, and descend instructions.

9. A terrain clearance system as set forth in claim 8 in which said visual display means includes a motor, a disc connected to said motor, indicia on predetermined portions of said disc, individual portions of said indicia being representative of said individual logic instruction signals, brake means associated with said motor, each of said logic means being connected to said motor and said brake means to cause said motor to drive and said brake to stop said disc so that the portion of the indicia thereon representative of the respective instruction signal provided by each of said logic means at any given instant is readily visible in a predetermined position.

10. A terrain clearance system as set forth in claim 9 in which said radar set includes a rotating antenna, a phase detector means asosciated with said antenna to provide a fourth signal which is indicative of the position of said antenna at any given instant, enable relay means associated with said phase detector means which enables each of said four logic means when said antenna is in a predetermined position, said visual display means includes a plurality of reed means located in an arc, said arc depicting various possible headings to the right and the left of said predetermined antenna position, each of said reed means having both an obstacle and a safe position, each of said reed means being in its obstacle position whenever a said first climb signal occurs simultaneously with said antenna position signal which corresponds to the heading represented by said reed means.

References Cited by the Examiner
UNITED STATES PATENTS

| | | | |
|---|---|---|---|
| 2,965,894 | 12/60 | Sweeney | 343—7 |
| 3,086,200 | 4/63 | Altermann | 343—5 |

CHESTER L. JUSTUS, *Primary Examiner.*

KATHLEEN CLAFFY, *Examiner.*